(12) United States Patent
Todoroki (10) Patent No.: US 10,857,838 B2
(45) Date of Patent: Dec. 8, 2020

(54) PNEUMATIC TIRE

(71) Applicant: SUMITOMO RUBBER INDUSTRIES, LTD., Kobe (JP)

(72) Inventor: Daisuke Todoroki, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 788 days.

(21) Appl. No.: 15/400,042

(22) Filed: Jan. 6, 2017

(65) Prior Publication Data

US 2017/0217257 A1 Aug. 3, 2017

(30) Foreign Application Priority Data

Feb. 2, 2016 (JP) .................................. 2016-018040

(51) Int. Cl.
*B60C 13/00* (2006.01)
*B60C 13/04* (2006.01)
*B60C 15/00* (2006.01)
*B60C 15/06* (2006.01)
*B60C 3/04* (2006.01)

(52) U.S. Cl.
CPC .............. *B60C 13/00* (2013.01); *B60C 13/04* (2013.01); *B60C 15/0027* (2013.01); *B60C 15/06* (2013.01); *B60C 3/04* (2013.01); *B60C 2013/006* (2013.01); *B60C 2013/007* (2013.01); *B60C 2013/045* (2013.01); *B60C 2015/0614* (2013.01); *B60C 2200/06* (2013.01)

(58) Field of Classification Search
CPC ... B60C 13/00; B60C 13/04; B60C 2013/005; B60C 2013/006; B60C 2013/007; B60C 2013/045; B60C 2015/0614; Y10T 152/10828

USPC ......................................................... 152/525
See application file for complete search history.

(56) References Cited

U.S. PATENT DOCUMENTS 3,612,137 A * 10/1971 Guyot ................. B60C 15/0607
152/546 X
6,053,229 A * 4/2000 Suzuki ................ B60C 15/0607
152/555 X
7,040,369 B2 * 5/2006 Hirayama
(Continued)

FOREIGN PATENT DOCUMENTS

| JP | 2002-178724 A | 6/2002 |
| JP | 2007-196988 A | 8/2007 |
| WO | WO-2014/122953 A1 * | 8/2014 |

OTHER PUBLICATIONS

Extended European Search Report dated Jun. 28, 2017 for Application No. 17150398.0.

*Primary Examiner* — Adrienne C. Johnstone
(74) *Attorney, Agent, or Firm* — Birch, Stewart, Kolasch & Birch, LLP (57) ABSTRACT

In a tire 2 of the present invention, sidewalls 6 each include an outer layer 6a, and an inner layer 6b disposed inward of the outer layer 6a in the axial direction. A loss tangent of the inner layer 6b is less than a loss tangent of the outer layer 6a. When Hr represents a height, in the radial direction, from a bead base line BBL to an outer side end of a rim R, and Hi represents a height, in the radial direction, from the bead base line BBL to an inner side end 46 of the inner layer 6b, a ratio (Hi/Hr) of the height Hi to the height Hr is greater than or equal to 0.0 and not greater than 3.0.

8 Claims, 2 Drawing Sheets

(56) References Cited

U.S. PATENT DOCUMENTS

| | | | |
|---|---|---|---|
| 7,150,301 B2 * | 12/2006 | Serra | B60C 13/00 152/525 |
| 7,165,590 B2 * | 1/2007 | Sugiyama | |
| 7,543,619 B2 * | 6/2009 | Numata | B60C 13/04 152/525 X |
| 7,615,590 B2 * | 11/2009 | Mizuno | 152/525 |
| 8,807,183 B2 * | 8/2014 | Maruoka | |
| 8,813,803 B2 * | 8/2014 | Matsuda | B60C 13/00 152/525 |
| 2007/0151649 A1 | 7/2007 | Numata | |
| 2015/0367685 A1 * | 12/2015 | Takahashi | B60C 13/00 152/525 |
| 2017/0217258 A1 * | 8/2017 | Todoroki | B60C 13/04 |

* cited by examiner

PNEUMATIC TIRE

This application claims priority on Patent Application No. 2016-018040 filed in JAPAN on Feb. 2, 2016. The entire contents of this Japanese Patent Application are hereby incorporated by reference.

BACKGROUND OF THE INVENTION

Field of the Invention

The present invention relates to pneumatic tires. More specifically, the present invention relates to heavy duty pneumatic tires which are to be mounted to vehicles such as trucks, buses, and the like.

Description of the Related Art

In recent years, reduction of fuel consumption is particularly strongly required for vehicles in consideration of the environment. Tires exert influence on fuel efficiency of vehicles. Therefore, development of a "fuel-efficient tire" that contributes to reduction of fuel consumption is advanced. In order to achieve, by a tire, reduction of fuel consumption, it is important to reduce rolling resistance of the tire. When a tire rolls, deformation and restoration are repeated. Energy loss caused by the deformation and restoration is a main cause of rolling resistance of the tire. Reduction of the energy loss is important for reducing rolling resistance. Reduction of the energy loss in sidewalls is also required. A tire in which energy loss is reduced in sidewalls is disclosed in JP2007-196988 (US2007/0151649). In the tire, each sidewall has a two-layer structure that includes an outer rubber portion and an inner rubber portion. The inner rubber portion is formed of rubber (low heat generating rubber) having a loss tangent that is less than that of conventional rubber, whereby rolling resistance is reduced. The outer rubber portion is formed of rubber having a loss tangent and a complex elastic modulus that are higher than those of the inner rubber portion, whereby reduction of durability is inhibited.

Increased reduction of rolling resistance is required since reduction of fuel consumption is highly required for vehicles. In addition, tires are required to maintain high durability.

In order to further reduce rolling resistance, a method for increasing the proportion of low heat generating rubber used for a tire may be considered. This can be realized by the inner rubber of sidewalls being extended to bead portions. However, heavy load is applied to the bead portions from a rim. Chafers have a complex elastic modulus that is higher than that of the sidewalls in order to protect the bead portions. If the inner rubber having low complex elastic modulus and loss tangent is extended to the bead portions, strain in the portions may be increased. This may cause reduction of durability in the portions. This may cause reduction of durability of the tire.

An object of the present invention is to provide a pneumatic tire that allows rolling resistance to be further reduced, and also allows high durability to be achieved.

SUMMARY OF THE INVENTION

A pneumatic tire according to the present invention includes: a tread having an outer surface which forms a tread surface; a pair of sidewalls that extend almost inward from ends, respectively, of the tread in a radial direction; a pair of chafers disposed inward of the sidewalls, respectively, in the radial direction; a pair of beads disposed inward of the chafers, respectively, in an axial direction; and a carcass extended on and between one of the beads and the other of the beads along inner sides of the tread and the sidewalls. The sidewalls each include an outer layer, and an inner layer disposed inward of the outer layer in the axial direction. A loss tangent LTi of the inner layer is less than a loss tangent LTo of the outer layer. A complex elastic modulus $Ei^*$ of the inner layer is less than a complex elastic modulus $Ec^*$ of the chafers. The carcass includes a carcass ply. The carcass ply is turned up around the beads from an inner side toward an outer side in the axial direction, and, by the carcass ply being turned up, the carcass ply has a main portion and turned-up portions. When, in a state where the tire is mounted on a rim, Hr represents a height, in the radial direction, from a bead base line BBL to an outer side end of the rim, and Hi represents a height, in the radial direction, from the bead base line BBL to an inner side end of the inner layer, a ratio (Hi/Hr) of the height Hi to the height Hr is greater than or equal to 0.0 and not greater than 3.0. When Po represents an inner side end, in the radial direction, of an interface between the outer layer and a corresponding one of the chafers, a position of the inner side end Po is equal to a position of the outer side end of the rim or is outward of the position of the outer side end of the rim in the radial direction. The position of the inner side end Po is equal to a position of an outer side end of a corresponding one of the turned-up portions or is inward of the position of the outer side end of the turned-up portion in the radial direction.

The inventors have examined in detail a structure of the sidewalls each of which includes: the inner layer having a low loss tangent; and the outer layer having a loss tangent higher than the inner layer. As a result, it has been found that, even if the inner layer is extended to the bead portion, in a case where an interfacial position between the outer layer of the sidewall and the chafer is appropriately adjusted, durability can be advantageously maintained.

In the tire according to the present invention, the sidewalls each include the inner layer and the outer layer. The loss tangent of the inner layer is less than the loss tangent of the outer layer. The inner layer is formed of low heat generating rubber. When Hr represents the height, in the radial direction, from the bead base line to the outer side end of the rim, and Hi represents the height, in the radial direction, from the bead base line to the inner side end of the inner layer, the ratio (Hi/Hr) of the height Hi to the height Hr is greater than or equal to 0.0 and not greater than 3.0. The inner layer is extended to the bead portion. In the tire, the proportion of the low heat generating rubber used for the tire is greater than that for conventional tires. In the tire, rolling resistance is reduced.

The complex elastic modulus of the inner layer is less than the complex elastic modulus of the chafers. The inner layer is flexible. In the tire, a position of the inner side end Po of the interface between the outer layer and the chafer is equal to a position of the outer side end of the rim or is outward of the position of the outer side end of the rim in the radial direction. A position of the inner side end Po is equal to a position of the outer side end of the turned-up portion of the carcass ply or is inward of the position of the outer side end of the turned-up portion in the radial direction. In this structure, even if the flexible inner layer is extended to the bead portion, strain in the interface between the outer layer and the chafer is reduced. In the tire, durability is advantageously maintained in the bead portions. The tire is excellent in durability.

Preferably, the ratio (Hi/Hr) of the height Hi to the height Hr is not greater than 1.5.

Preferably, when Lp represents an imaginary line that extends in the axial direction from the outer side end, in the radial direction, of the turned-up portion, a thickness Ti, of the inner layer, measured along the imaginary line Lp is greater than or equal to 2 mm and not greater than 5 mm.

Preferably, the tire further includes fillers which are turned up around the beads on an outer side of the carcass. The fillers each include: a first end disposed inward of a corresponding one of the beads in the axial direction, and a second end disposed outward of the bead in the axial direction. When Hf represents a height, in the radial direction, from the bead base line to the second end, a difference (Hp-Hf) between a height Hp and the height Hf, is greater than or equal to 6 mm and not greater than 14 mm.

Preferably, a ratio (Hp/Hr) of a height Hp to the height Hr, is greater than or equal to 2 and not greater than 4.

Preferably, a loss tangent LTi of the inner layer is higher than or equal to 0.02 and not higher than 0.05.

Preferably, the complex elastic modulus Ei* of the inner layer is higher than or equal to 2 MPa and not higher than 5 MPa.

DESCRIPTION OF THE PREFERRED EMBODIMENTS

The following will describe in detail the present invention based on preferred embodiments with reference where appropriate to the accompanying drawing.

Figure 1:
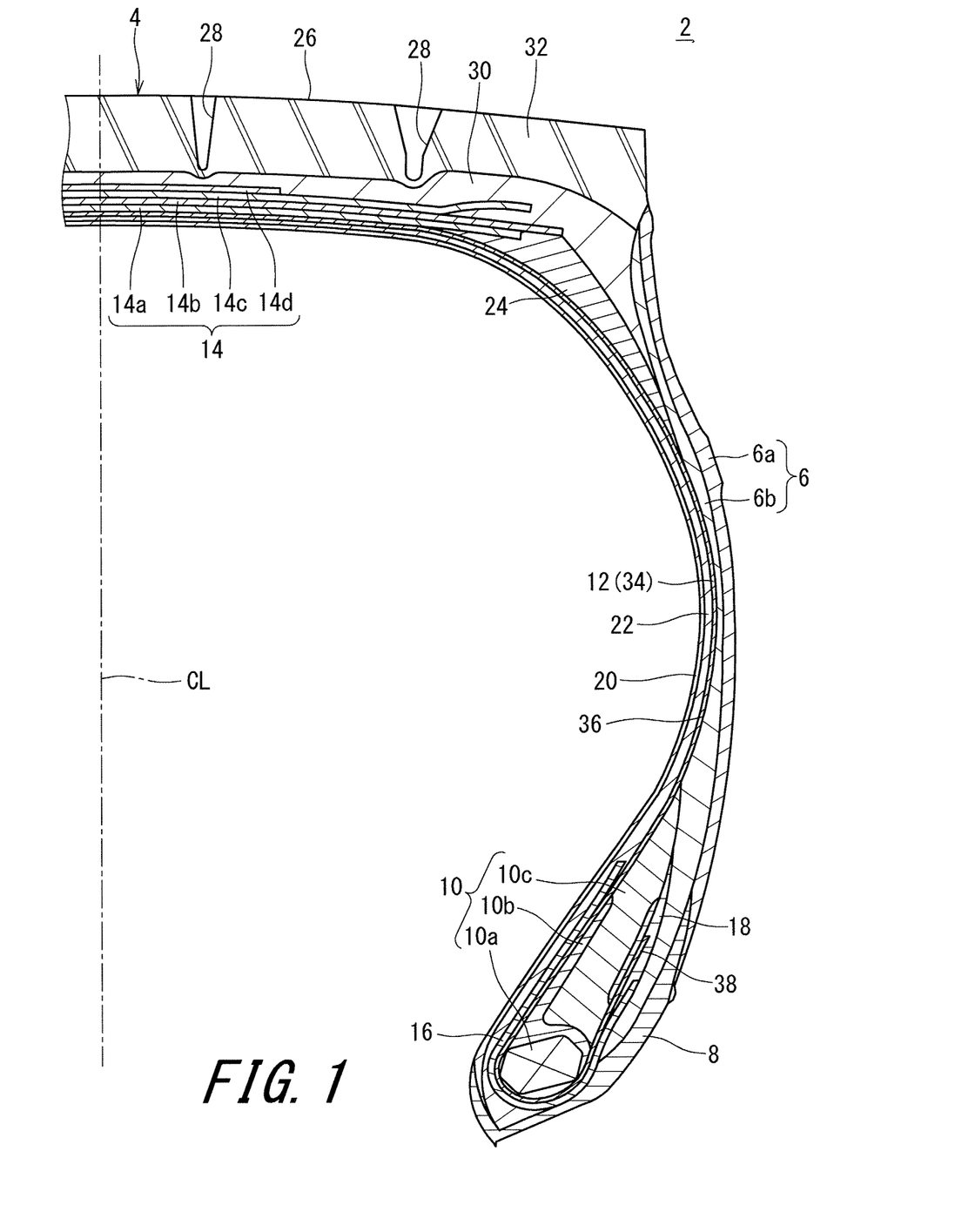
FIG. 1 is a cross-sectional view of a part of a tire according to one embodiment of the present invention.

FIG. 1 shows a pneumatic tire 2. In FIG. 1, the up-down direction represents the radial direction of the tire 2, the left-right direction represents the axial direction of the tire 2, and the direction perpendicular to the surface of the drawing sheet represents the circumferential direction of the tire 2. In FIG. 1, an alternate long and short dash line CL represents the equator plane of the tire 2. The shape of the tire 2 is symmetric about the equator plane except for a tread pattern.

The tire 2 includes a tread 4, sidewalls 6, chafers 8, beads 10, a carcass 12, a belt 14, fillers 16, cover rubbers 18, an inner liner 20, an insulation 22, and cushion layers 24. The tire 2 is of a tubeless type. The tire 2 is mounted to a truck, a bus, or the like. The tire 2 is a heavy duty tire.

The tread 4 has a shape that projects outward in the radial direction. The tread 4 forms a tread surface 26 that can contact with a road surface. The tread surface 26 has grooves 28 formed therein. A tread pattern is formed by the grooves 28. The tread 4 includes a base layer 30 and a cap layer 32. The cap layer 32 is disposed outward of the base layer 30 in the radial direction. The cap layer 32 is layered over the base layer 30. The base layer 30 is formed of crosslinked rubber excellent in adhesiveness. A typical base rubber of the base layer 30 is natural rubber. The cap layer 32 is formed of crosslinked rubber excellent in wear resistance, heat resistance, and grip performance.

The sidewalls 6 extend almost inward from ends of the tread 4 in the radial direction. As shown in FIG. 1, each sidewall 6 includes an outer layer 6a and an inner layer 6b.

The outer layer 6a forms a part of an outer surface of the tire 2. The outer layer 6a is disposed outward of the inner layer 6b in the axial direction. Near the radially inner side ends of the outer layers 6a, the outer layers 6a contact with the chafers 8. The outer layer 6a is formed of crosslinked rubber excellent in external damage resistance and weather resistance.

The inner layer 6b is disposed inward of the outer layer 6a in the axial direction. The inner layer 6b contacts with the axially inner side surface of the outer layer 6a. The radially inner side end of the inner layer 6b is disposed outward of the bead 10 in the axial direction. The radially inner side end of the inner layer 6b is disposed inward of the chafer 8 in the axial direction.

The outer layer 6a and the inner layer 6b are more flexible than the chafers 8. A complex elastic modulus Eo* of the outer layer 6a and a complex elastic modulus Ei* of the inner layer 6b are less than a complex elastic modulus Ec* of the chafers 8. The flexible outer layer 6a and inner layer 6b contribute to excellent ride comfort.

In the tire 2, a loss tangent LTi of the inner layer 6b is less than a loss tangent LTo of the outer layer 6a. The inner layer 6b is formed of low heat generating rubber.

In the present invention, the loss tangents LTi and LTo, and the complex elastic moduli Ei*, Eo*, and Ec* are measured in compliance with the standard of "JIS K 6394", by using a viscoelasticity spectrometer ("VESF-3" manufactured by Iwamoto Seisakusho), under the following conditions.

Initial strain: 10%
Amplitude: ±2.0%
Frequency: 10 Hz
Deformation mode: tension
Measurement temperature: 30° C.

Each chafer 8 is disposed almost inward of the outer layer 6a in the radial direction. The chafers 8 are disposed outward of the beads 10 and the carcass 12 in the axial direction. When the tire 2 is mounted on a rim, the chafers 8 contact with the rim. By the contact, portions near the beads 10 are protected. Therefore, the chafers 8 are harder than the sidewalls 6. The chafers 8 are formed of crosslinked rubber excellent in wear resistance. The complex elastic modulus Ec* of the chafers 8 is higher than or equal to 10 MPa and not higher than 90 MPa.

The beads 10 are disposed inward of the sidewalls 6 in the radial direction. Each bead 10 includes a core 10a, an apex 10b that extends outward from the core 10a in the radial direction, and a packing rubber 10c that extends outward from the apex 10b in the radial direction. The core 10a is ring-shaped. The core 10a includes a plurality of non-stretchable wires. The apex 10b is tapered outward in the radial direction. The apex 10b is formed of highly hard crosslinked rubber. The packing rubber 10c is tapered outward in the radial direction. The packing rubber 10c is flexible. The packing rubber 10c reduces concentration of stress on the end of the carcass 12.

The carcass 12 includes a carcass ply 34. The carcass ply 34 is extended on and between the beads 10 on both sides, along inner sides of the tread 4 and the sidewalls 6. The carcass ply 34 is turned up around the cores 10a from the inner side toward the outer side in the axial direction. By the turning-up, the carcass ply 34 includes a main portion 36 and turned-up portions 38.

The carcass ply 34 includes multiple cords aligned with each other, and topping rubber, which is not shown. An absolute value of an angle of each cord relative to the equator plane is from 45° to 90°, and more preferably from 75° to 90°. In other words, the carcass 12 forms a radial structure. The cords are formed of steel. The carcass 12 may include two or more carcass plies 34.

The belt 14 extends in the axial direction on the cross section obtained by cutting the tire 2 at a plane perpendicular to the circumferential direction. The belt 14 is disposed inward of the tread 4 in the radial direction. The belt 14 is disposed outward of the carcass 12 in the radial direction. The belt 14 reinforces the carcass 12. In the tire 2, the belt 14 includes a first layer 14a, a second layer 14b, a third layer 14c, and a fourth layer 14d.

In the tire 2, the ends of the second layer 14b are disposed outward of the ends of the first layer 14a in the axial direction. The ends of the second layer 14b are disposed outward of the ends of the third layer 14c in the axial direction. The ends of the second layer 14b are disposed outward of the ends of the fourth layer 14d in the axial direction. In the tire 2, among the first layer 14a, the second layer 14b, the third layer 14c, and the fourth layer 14d of the belt 14, the second layer 14b has the largest width. In the tire 2, the ends of the second layer 14b are the ends of the belt 14.

Each of the first layer 14a, the second layer 14b, the third layer 14c, and the fourth layer 14d includes multiple cords aligned with each other, and topping rubber, which is not shown. Each cord is formed of steel. The cords tilt relative to the equator plane. An absolute value of an angle of each cord relative to the equator plane is from 15° to 70°.

The fillers 16 are turned up around the beads 10, respectively. The fillers 16 are turned up around the cores 10a of the beads 10, respectively. The fillers 16 are layered over the carcass ply 34. Each filler 16 includes a first end 40 disposed inward of the bead 10 in the axial direction, and a second end 42 disposed outward of the bead 10 in the axial direction. Each filler 16 includes multiple cords aligned with each other, and topping rubber. Each cord is formed of steel. The filler 16 is referred to also as a steel filler. The fillers 16 can contribute to durability of the tire 2.

Each cover rubber 18 is disposed outward of the apex 10b in the axial direction. The cover rubbers 18 cover ends 44 of the turned-up portions 38 of the carcass ply 34, as illustrated in the drawings.

The inner liner 20 forms an inner surface of the tire 2. The inner liner 20 is formed of crosslinked rubber. For the inner liner 20, rubber excellent in airtightness is used. A typical base rubber of the inner liner 20 is isobutylene-isoprene-rubber or halogenated isobutylene-isoprene-rubber. The inner liner 20 maintains internal pressure of the tire 2.

The insulation 22 is disposed outward of the inner liner 20. The insulation 22 is disposed inward of the carcass 12. The insulation 22 is disposed between the carcass 12 and the inner liner 20. The insulation 22 is formed of crosslinked rubber excellent in adhesiveness. The insulation 22 is joined firmly to the carcass 12, and is also joined firmly to the inner liner 20. The insulation 22 allows separation of the inner liner 20 from the carcass 12 to be inhibited.

The cushion layers 24 are layered over the carcass 12 near the ends of the belt 14. The cushion layers 24 are formed of flexible crosslinked rubber. The cushion layers 24 absorb stress at the ends of the belt 14. The cushion layers 24 allow lifting of the belt 14 to be inhibited.

Figure 2:
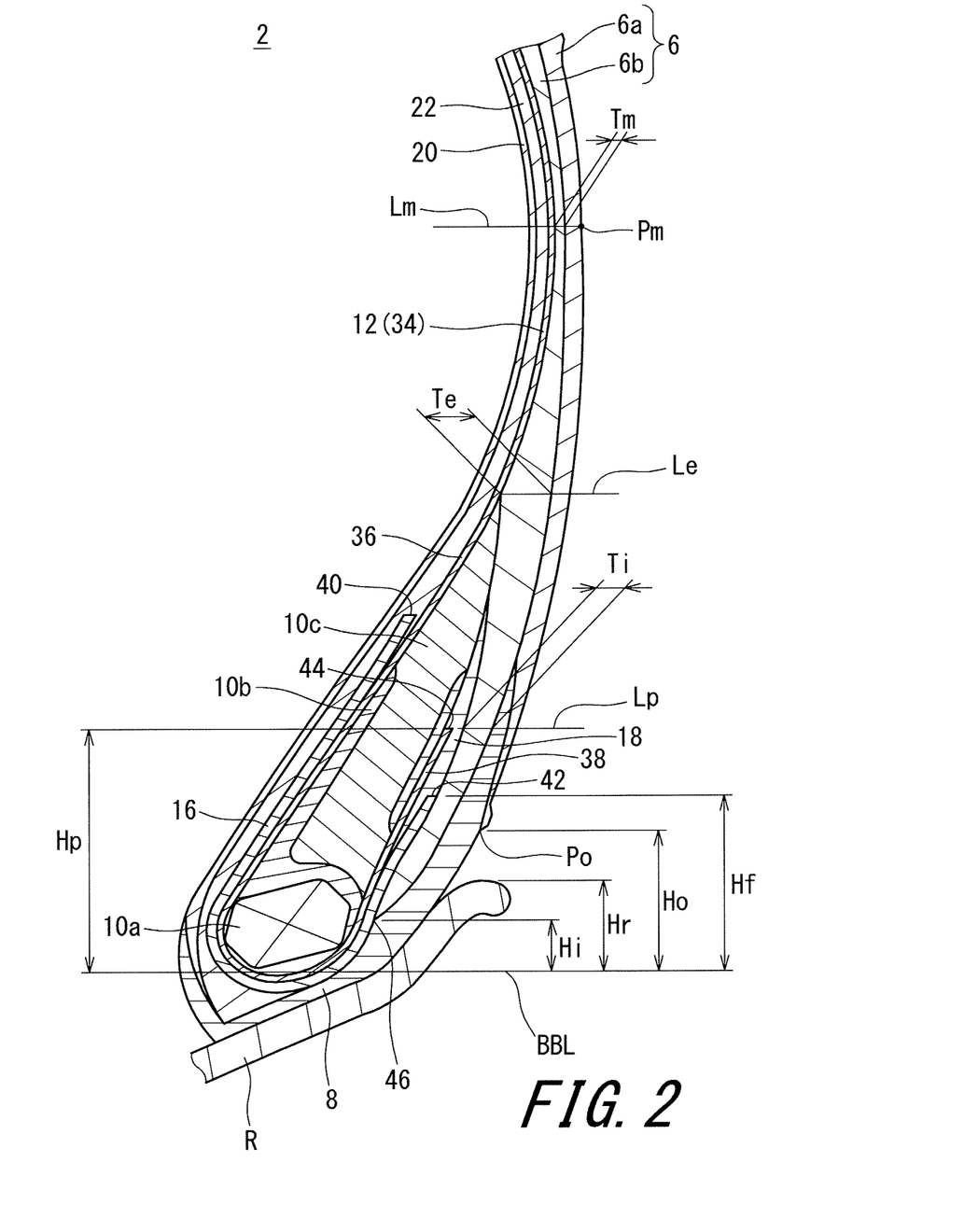
FIG. 2 is an enlarged cross-sectional view of a part of the tire shown in FIG. 1.

FIG. 2 is an enlarged cross-sectional view of the tire 2 shown in FIG. 1 and illustrates a bead 10 portion. In FIG. 2, the up-down direction represents the radial direction, the left-right direction represents the axial direction, and the direction perpendicular to the surface of the drawing sheet represents the circumferential direction. In FIG. 2, reference character R represents a rim on which the tire 2 is mounted. In FIG. 2, the tire 2 is mounted on the rim R. A solid line BBL represents a bead base line. The bead base line BBL corresponds to a line that defines a rim diameter of the rim R (see JATMA). The bead base line BBL extends in the axial direction.

As shown in FIG. 2, the inner layers 6b extend between the beads 10 and the chafers 8 to portions near the cores 10a of the beads 10. In FIG. 2, a double-headed arrow Hi represents a height, in the radial direction, from the bead base line BBL to an inner side end 46 of the inner layer 6b. A double-headed arrow Hr represents a height, in the radial direction, from the bead base line BBL to an outer side end of a flange of the rim R. In the tire 2, a ratio (Hi/Hr) of the height Hi to the height Hr is greater than or equal to 0.0 and not greater than 3.0. When the ratio (Hi/Hr) is 0.0, the inner side end 46 of the inner layer 6b is disposed just on the bead base line BBL.

In FIG. 2, reference character Po represents an inner side end, in the radial direction, of an interface between the outer layer 6a and the chafer 8. A double-headed arrow Ho represents a height, in the radial direction, from the bead base line BBL to the inner side end Po. In the tire 2, the height Ho is greater than or equal to the height Hr. That is, in the radial direction, a position of the inner side end Po is equal to a position of the outer side end of the rim, or is outward of the position of the outer side end of the rim.

In FIG. 2, a double-headed arrow Hp represents a height, in the radial direction, from the bead base line BBL to the outer side end 44 of the turned-up portion 38 of the carcass ply 34. In the tire 2, the height Ho is less than or equal to the height Hp. That is, in the radial direction, a position of the inner side end Po is equal to a position of the outer side end 44 of the turned-up portion 38 or is inward of the position of the outer side end 44 of the turned-up portion 38.

Hereinafter, an action and effect of the present invention will be described.

In the tire 2 according to the present invention, each sidewall 6 includes the inner layer 6b and the outer layer 6a. The loss tangent LTi of the inner layer 6b is less than the loss tangent LTo of the outer layer 6a. The inner layer 6b is formed of low heat generating rubber. A ratio (Hi/Hr) of the height Hi, in the radial direction, from the bead base line BBL to the inner side end 46 of the inner layer 6b, relative to the height Hr, in the radial direction, from the bead base line BBL to the outer side end of the rim, is less than or equal to 3.0. The inner layer 6b extends to the bead 10 portion. In the tire 2, the proportion of the low heat generating rubber is greater than that in a conventional tire. In the tire 2, rolling resistance is reduced. Further, in the tire 2, the ratio (Hi/Hr) is not less than 0.0. This inhibits generation of strain in an interface between the filler 16 and the chafer 8 near a portion inward of each bead 10 in the radial direction. This contributes to advantageous durability in the bead 10 portions.

The ratio (Hi/Hr) is preferably less than or equal to 1.5. When the ratio (Hi/Hr) is less than or equal to 1.5, the inner layer 6b allows rolling resistance to be further reduced. Further, the inner side ends 46 of the inner layers 6b can be sufficiently distant from the outer side ends 44 of the turned-up portions 38. This contributes to improvement of durability in the bead 10 portions. In this viewpoint, the ratio (Hi/Hr) is more preferably less than or equal to 1.3. The ratio (Hi/Hr) is preferably not less than 0.2. When the ratio (Hi/Hr) is not less than 0.2, the inner layer 6b allows generation of strain in the interface between the filler 16 and the chafer 8 to be inhibited with enhanced effectiveness.

In the tire 2, the height Ho from the bead base line BBL to the inner side end Po of the interface between the outer layer 6a and the chafer 8 on the outer surface of the tire 2, is greater than or equal to the height Hr, in the radial direction, from the bead base line BBL to the outer side end of the flange. When the tire 2 is mounted on the rim, the chafers 8 contact with the flanges of the rim R. The outer layers 6a do not contact with the flanges. In the bead 10 portions, excellent durability is maintained. In the tire 2, the height Ho is less than the height Hp, in the radial direction, from the bead base line BBL to the outer side end 44 of the turned-up portion 38 of the carcass ply 34. Thus, when the bead 10 portion is under a load, strain in the interface between the outer layer 6a and the chafer is reduced. In this structure, even when the flexible inner layers 6b extend to the bead 10 portions, durability is advantageously maintained in the bead 10 portions. The tire 2 is excellent in durability.

In FIG. 2, a solid line Lp represents an imaginary line that extends, in the axial direction, from the outer side end 44 of the turned-up portion 38 of the carcass ply 34. A double-headed arrow Ti represents a thickness, of the inner layer 6b, which is measured along the imaginary line Lp. That is, the thickness Ti represents a distance, between the inner side surface and the outer side surface of the inner layer 6b, which is measured along the solid line Lp. The thickness Ti is preferably greater than or equal to 2.0 mm. The inner layer 6b in which the thickness Ti is greater than or equal to 2.0 mm, effectively contributes to reduction of rolling resistance. In this viewpoint, the thickness Ti is more preferably greater than or equal to 2.5 mm.

The thickness Ti is preferably not greater than 5.0 mm. In the tire 2 having the inner layer 6b in which the thickness Ti is not greater than 5.0 mm, stiffness in the bead 10 portions can be appropriately maintained. Thus, durability is advantageously maintained in the bead 10 portions. In this viewpoint, the thickness Ti is more preferably not greater than 4.5 mm.

In FIG. 2, a solid line Le represents an imaginary line that extends in the axial direction from the outermost end of the packing rubber. A double-headed arrow Te represents a thickness, of the inner layer 6b, which is measured along the imaginary line Le. That is, the thickness Te represents a distance, between the inner side surface and the outer side surface of the inner layer 6b, which is measured along the imaginary line Le. The thickness Te is preferably greater than or equal to 2.0 mm. The inner layer 6b in which the thickness Te is greater than or equal to 2.0 mm effectively contributes to reduction of rolling resistance. In this viewpoint, the thickness Te is more preferably greater than or equal to 2.5 mm. As shown in FIG. 1, the position of the outermost end of the inner layer 6b is outward of the position of the outermost end of the packing rubber 10c in the radial direction.

The thickness Te is preferably not greater than 6.0 mm. In the tire 2 having the inner layer 6b in which the thickness Te is not greater than 6.0 mm, the thickness of the outer layer 6a can be appropriately maintained. The sidewalls 6 are excellent in external damage resistance. In this viewpoint, the thickness Te is more preferably not greater than 5.5 mm.

In FIG. 2, a point Pm is a point at which the width of the tire 2 is maximum on the outer surface of the tire 2. A solid line Lm represents an imaginary line that extends from the point Pm in the axial direction. A double-headed arrow Tm represents a distance, between the inner side surface and the outer side surface of the inner layer 6b, which is measured along the imaginary line Lm. In other words, this represents the thickness of the inner layer 6b at the position where the tire 2 has the maximum width. The thickness Tm is preferably greater than or equal to 1.0 mm. The inner layer 6b in which the thickness Tm is greater than or equal to 1.0 mm effectively contributes to reduction of rolling resistance. In this viewpoint, the thickness Tm is more preferably greater than or equal to 1.5 mm.

The thickness Tm is preferably not greater than 4.0 mm. In the tire 2 having the inner layer 6b in which the thickness Tm is not greater than 4.0 mm, the thickness of the outer layer 6a can be appropriately maintained. The sidewalls 6 are excellent in external damage resistance. In this viewpoint, the thickness Tm is more preferably not greater than 3.5 mm.

In FIG. 2, a double-headed arrow Hf represents a height, in the radial direction, from the bead base line BBL to the second end 42 of the filler 16. A difference (Hp-Hf) is preferably greater than or equal to 6.0 mm. In the tire 2 in which the difference (Hp-Hf) is greater than or equal to 6.0 mm, the end of the filler 16 and the outer side end 44 of the turned-up portion 38 are sufficiently distant from each other. Thus, concentration of strain on the bead 10 portion is effectively inhibited. This contributes to advantageous durability in the bead 10 portions. In this viewpoint, the difference (Hp-Hf) is more preferably greater than or equal to 7.0 mm.

The difference (Hp-Hf) is preferably not greater than 14.0 mm. When the difference (Hp-Hf) is not greater than 14.0 mm, the fillers 16 effectively reinforce the carcass ply 34. This contributes to advantageous durability in the bead 10 portions. In this viewpoint, the difference (Hp-Hf) is more preferably not greater than 12.0 mm.

A ratio (Hp/Hr) is preferably greater than or equal to 2.0. When the ratio (Hp/Hr) is greater than or equal to 2.0, the turned-up portions 38 prevent the carcass ply 34 from being displaced around the beads 10. This contributes to advantageous durability in the bead 10 portions. In this viewpoint, the ratio (Hp/Hr) is more preferably greater than or equal to 2.5.

The ratio (Hp/Hr) is preferably not greater than 4.0. When the ratio (Hp/Hr) is not greater than 4.0, the turned-up portion 38 allows generation of strain in the end portion thereof to be effectively inhibited. This contributes to advantageous durability in the bead 10 portions. In this viewpoint, the ratio (Hp/Hr) is more preferably not greater than 3.5.

The loss tangent LTi is preferably less than or equal to 0.05. In the inner layers 6b in which the loss tangent LTi is less than or equal to 0.05, energy loss can be reduced. In the tire 2, rolling resistance can be made low. In this viewpoint, the loss tangent LTi is more preferably less than or equal to 0.04.

The loss tangent LTi is preferably not less than 0.02. In the inner layers 6b in which the loss tangent LTi is not less than 0.02, excellent durability can be maintained in the bead 10 portions. In the tire 2, high durability is maintained.

The loss tangent LTo is preferably less than or equal to 0.10. In the tire 2 having the outer layers 6a in which the loss tangent LTo is less than or equal to 0.10, energy loss can be reduced. In the tire 2, rolling resistance can be made low. In this viewpoint, the loss tangent LTo is more preferably less than or equal to 0.09. The loss tangent LTo is preferably not less than 0.05. The outer layers 6a in which the loss tangent LTo is not less than 0.05 can sufficiently absorb impact from a road surface. The tire 2 is excellent in ride comfort. In this viewpoint, the loss tangent LTo is more preferably not less than 0.06.

The complex elastic modulus Ei* of the inner layer 6b is preferably higher than or equal to 2 MPa. When the complex elastic modulus Ei* is higher than or equal to 2 MPa in the inner layer 6b, a difference between the complex elastic modulus Ei* of the inner layer 6b and the complex elastic modulus Eo* of the outer layer 6a can be reduced. In the tire 2, when the tire 2 is under a load, strain in an interface between the inner layer 6b and the outer layer 6a can be reduced. In this viewpoint, the complex elastic modulus Ei* is more preferably higher than or equal to 2.5 MPa. The complex elastic modulus Ei* is preferably not higher than 5 MPa. In the inner layer 6b in which the complex elastic modulus Ei* is not higher than 5 MPa, stiffness in the side portions can be made appropriate. The tire 2 is excellent in ride comfort and steering stability.

The complex elastic modulus Eo* of the outer layer 6a is preferably higher than or equal to 3 MPa. In the outer layer 6a in which the complex elastic modulus Eo* is higher than or equal to 3 MPa, durability is excellent. In this viewpoint, the complex elastic modulus Eo* is more preferably higher than or equal to 4 MPa. The complex elastic modulus Eo* is preferably not higher than 15 MPa. In the tire 2 having the outer layer 6a in which the complex elastic modulus Eo* is not higher than 15 MPa, stiffness in the side portions can be appropriately adjusted. The tire 2 is excellent in ride comfort and steering stability.

In the present invention, the dimensions and angles of the tire 2 and each component of the tire 2 are measured in a state where the tire 2 is mounted on a normal rim and inflated with air to a normal internal pressure. During the measurement, no load is applied to the tire 2. In the description herein, the normal rim represents a rim that is specified according to the standard with which the tire 2 complies. The "standard rim" in the JATMA standard, the "Design Rim" in the TRA standard, and the "Measuring Rim" in the ETRTO standard are normal rims. In the description herein, the normal internal pressure represents an internal pressure that is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. In the description herein, the normal load represents a load that is specified according to the standard with which the tire 2 complies. The "maximum load capacity" in the JATMA standard, the "maximum value" recited in "TIRE LOAD LIMITS AT VARIOUS COLD INFLATION PRESSURES" in the TRA standard, and the "LOAD CAPACITY" in the ETRTO standard, are normal loads.

EXAMPLES

Example 1

A tire, of Example 1, having the structure shown in FIG. 1 was obtained. The size of the tire was 11R22.5. Specifications of the tire are indicated in Table 1. In the tire, the thickness Te was 4.0 mm, and the thickness Tm was 3.0 mm, which are not indicated in the table. The height Hr of a flange of a rim on which the tire was to be mounted was 12.7 mm.

Comparative Example 1

A tire of Comparative example 1 having the specifications indicated in Table 1 was obtained. This tire was a tire in which each sidewall had the outer layer and the inner layer, and the inner layer did not extend to the bead portion.

Example 2

A tire of Example 2 was obtained in the same manner as for Example 1 except that the height Hp was different and the ratio (Hp/Hr) was as indicated in Table 1.

Examples 3 to 6 and Comparative Examples 2 to 3

Tires of Examples 3 to 6 and Comparative examples 2 to 3 were each obtained in the same manner as for Example 1 except that the height Hi was different and the ratio (Hi/Hr) was as indicated in Table 2. In Comparative example 2, the inner side end of the inner layer reached a portion inward of the bead base line BBL. Therefore, the ratio represents a minus value. In Example 6, the inner side end of the inner layer was extended merely to the outer side end of the turned-up portion. Therefore, the thickness Ti is 0.0 mm.

Examples 7 to 8 and Comparative Examples 4 to 5

Tires of Examples 7 to 8 and Comparative examples 4 to 5 were each obtained in the same manner as for Example 1 except that the height Ho was different and the ratio (Ho/Hr) was as indicated in Table 3.

Examples 9 to 14

Tires of Examples 9 to 14 were each obtained in the same manner as for Example 1 except that the thickness Ti was as indicated in Table 4.

Examples 16 to 19

Tires of Examples 16 to 19 were each obtained in the same manner as for Example 1 except that the height Hf was different and the difference (Hp−Hf) was as indicated in Table 5.

Example 15

A tire of Example 15 was obtained in the same manner as for Example 16 except that the height Hp was different and the ratio (Hp/Hr) was as indicated in Table 5.

Examples 20 to 22 and Comparative example 6

Tires of Examples 20 to 22 and Comparative example 6 were each obtained in the same manner as for Example 1 except that the loss tangent LTi was as indicated in Table 6.

[Rolling Resistance]

A rolling resistance testing machine was used to measure rolling resistance under the following measurement conditions.

Used rim: 7.50×22.5
Internal pressure: 800 kPa
Load: 29.42 kN
Speed: 80 km/h

The results are indicated below as index values in Tables 1 to 6 with the result of Comparative example 1 being 100. The less the value is, the lower rolling resistance is and the more excellent fuel efficiency is. The less the value is, the better the evaluation is.

[Evaluation for Durability]

For durability of bead portions, damage-to-bead resistance, external damage resistance, crack resistance, and wear resistance were evaluated. The evaluation methods were as follows.

[Evaluation for Damage-to-Bead Resistance]

A sample tire was mounted on a normal rim (7.50×22.5), and inflated with air to a normal internal pressure. The tire was mounted to a drum type tire testing machine, and vertical load corresponding to three times a normal load was applied to the tire. Running with the tire on the drum at the speed of 80 km/h was performed. A time that elapsed before the bead of the tire was damaged, was measured. The results are indicated below as index values in Tables 1 to 6 with the result of Comparative example 1 being 100. The greater the value is, the better the evaluation is.

[Evaluation for External Damage Resistance]

A sample tire was mounted on a normal rim (7.50×22.5), and inflated with air to a normal internal pressure. The tire was mounted to a vehicle, and a normal load was applied to the tire. The vehicle was caused to run on an asphalt road surface in a test course. The vehicle was caused to run until ribs (the groove depth was 14 mm) provided on the tread were all worn. Thereafter, the number of external damages in the sidewall was counted and the sizes of the external damages therein were measured. The external damage resistance obtained from the results is indicated below as indexes in Tables 1 to 6 with the result of Comparative example 1 being 100. The greater the value is, the better the evaluation is.

[Evaluation for Crack Resistance]

A vehicle was caused to run under the same condition as in the evaluation for external damage resistance. Thereafter, the size of a crack at an interfacial position between the sidewall and the chafer, was measured. The crack resistance obtained from the results is indicated below as indexes in Tables 1 to 6 with the result of Comparative example 1 being 100. The greater the value is, the better the evaluation is.

[Evaluation for Wear Resistance]

A vehicle was caused to run under the same condition as in the evaluation for external damage resistance. Thereafter, the depth of the wear in a portion, of the tire, which contacted with a rim flange, was measured. Reciprocals of values for the depth are indicated below as index values in Tables 1 to 6 with the result of Comparative example 1 being 100. The greater the reciprocal of the value is, the better the evaluation is.

TABLE 1

| | Evaluation result | | |
|---|---|---|---|
| | Comparative example 1 | Example 1 | Example 2 |
| Ratio (Hi/Hr) | 4.0 | 1.0 | 1.0 |
| Ratio (Ho/Hr) | 0.5 | 2.0 | 2.0 |
| Ratio (Hp/Hr) | 5.0 | 3.0 | 5.0 |
| Difference (Hp − Hf) [mm] | 4.0 | 10.0 | 10.0 |
| Thickness Ti [mm] | — | 3.0 | 3.0 |
| Loss tangent LTi | 0.03 | 0.03 | 0.03 |
| Complex elastic modulus $Ei^*$ [MPa] | 3.0 | 3.0 | 3.0 |
| Loss tangent LTo | 0.06 | 0.06 | 0.06 |
| Complex elastic modulus $Eo^*$ [MPa] | 3.0 | 3.0 | 3.0 |
| Rolling resistance | 100 | 83 | 83 |
| Damage-to-bead resistance | 100 | 150 | 140 |
| External damage resistance | 100 | 100 | 100 |
| Crack resistance | 100 | 150 | 150 |
| Wear resistance | 100 | 140 | 140 |

TABLE 2

| | Evaluation result | | | | | |
|---|---|---|---|---|---|---|
| | Comparative example 2 | Example 3 | Example 4 | Example 5 | Example 6 | Comparative example 3 |
| Ratio (Hi/Hr) | −0.2 | 0.0 | 0.2 | 1.5 | 3.0 | 4.0 |
| Ratio (Ho/Hr) | 2.0 | 2.0 | 2.0 | 2.0 | 2.0 | 2.0 |
| Ratio (Hp/Hr) | 3.0 | 3.0 | 3.0 | 3.0 | 3.0 | 3.0 |
| Difference (Hp-Hf) [mm] | 10.0 | 10.0 | 10.0 | 10.0 | 10.0 | 10.0 |
| Thickness Ti [mm] | 3.0 | 3.0 | 3.0 | 3.0 | 0.0 | — |
| Loss tangent LTi | 0.03 | 0.03 | 0.03 | 0.03 | 0.03 | 0.03 |
| Complex elastic modulus $Ei^*$ [MPa] | 3.0 | 3.0 | 3.0 | 3.0 | 3.0 | 3.0 |
| Loss tangent LTo | 0.06 | 0.06 | 0.06 | 0.06 | 0.06 | 0.06 |
| Complex elastic modulus $Eo^*$ [MPa] | 3.0 | 3.0 | 3.0 | 3.0 | 3.0 | 3.0 |
| Rolling resistance | 76 | 77 | 80 | 86 | 92 | 100 |
| Damage-to-bead resistance | 125 | 140 | 142 | 150 | 142 | 133 |
| External damage resistance | 100 | 100 | 100 | 100 | 100 | 100 |
| Crack resistance | 150 | 150 | 150 | 150 | 150 | 150 |
| Wear resistance | 140 | 140 | 140 | 140 | 140 | 140 |

TABLE 3

| | Evaluation result | | | |
|---|---|---|---|---|
| | Comparative example 4 | Example 7 | Example 8 | Comparative example 5 |
| Ratio (Hi/Hr) | 1.0 | 1.0 | 1.0 | 1.0 |
| Ratio (Ho/Hr) | 0.5 | 1.0 | 3.0 | 3.5 |
| Ratio (Hp/Hr) | 3.0 | 3.0 | 3.0 | 3.0 |
| Difference (Hp − Hf) [mm] | 10.0 | 10.0 | 10.0 | 10.0 |
| Thickness Ti [mm] | 3.0 | 3.0 | 3.0 | 3.0 |

TABLE 3-continued

Evaluation result

|  | Comparative example 4 | Example 7 | Example 8 | Comparative example 5 |
|---|---|---|---|---|
| Loss tangent LTi | 0.03 | 0.03 | 0.03 | 0.03 |
| Complex elastic modulus Ei* [MPa] | 3.0 | 3.0 | 3.0 | 3.0 |
| Loss tangent LTo | 0.06 | 0.06 | 0.06 | 0.06 |
| Complex elastic modulus Eo* [MPa] | 3.0 | 3.0 | 3.0 | 3.0 |
| Rolling resistance | 83 | 83 | 83 | 83 |
| Damage-to-bead resistance | 123 | 141 | 150 | 133 |
| External damage resistance | 100 | 100 | 100 | 100 |
| Crack resistance | 102 | 150 | 150 | 135 |
| Wear resistance | 100 | 140 | 140 | 140 |

TABLE 4

Evaluation result

|  | Example 9 | Example 10 | Example 11 | Example 12 | Example 13 | Example 14 |
|---|---|---|---|---|---|---|
| Ratio (Hi/Hr) | 1.0 | 1.0 | 1.0 | 1.0 | 1.0 | 1.0 |
| Ratio (Ho/Hr) | 2.0 | 2.0 | 2.0 | 2.0 | 2.0 | 2.0 |
| Ratio (Hp/Hr) | 3.0 | 3.0 | 3.0 | 3.0 | 3.0 | 3.0 |
| Difference (Hp-Hf) [mm] | 10.0 | 10.0 | 10.0 | 10.0 | 10.0 | 10.0 |
| Thickness Ti [mm] | 1.5 | 2.0 | 2.5 | 4.5 | 5.0 | 5.5 |
| Loss tangent LTi | 0.03 | 0.03 | 0.03 | 0.03 | 0.03 | 0.03 |
| Complex elastic modulus Ei* [MPa] | 3.0 | 3.0 | 3.0 | 3.0 | 3.0 | 3.0 |
| Loss tangent LTo | 0.06 | 0.06 | 0.06 | 0.06 | 0.06 | 0.06 |
| Complex elastic modulus Eo* [MPa] | 3.0 | 3.0 | 3.0 | 3.0 | 3.0 | 3.0 |
| Rolling resistance | 90 | 88 | 86 | 82 | 81 | 80 |
| Damage-to-bead resistance | 150 | 150 | 150 | 146 | 142 | 138 |
| External damage resistance | 100 | 100 | 100 | 100 | 100 | 100 |
| Crack resistance | 150 | 150 | 150 | 150 | 150 | 150 |
| Wear resistance | 140 | 140 | 140 | 140 | 140 | 140 |

TABLE 5

Evaluation result

|  | Example 15 | Example 16 | Example 17 | Example 18 | Example 19 |
|---|---|---|---|---|---|
| Ratio (Hi/Hr) | 1.0 | 1.0 | 1.0 | 1.0 | 1.0 |
| Ratio (Ho/Hr) | 2.0 | 2.0 | 2.0 | 2.0 | 2.0 |
| Ratio (Hp/Hr) | 5.0 | 3.0 | 3.0 | 3.0 | 3.0 |
| Difference (Hp − Hf) [mm] | 4.0 | 4.0 | 6.0 | 14.0 | 16.0 |
| Thickness Ti [mm] | 3.0 | 3.0 | 3.0 | 3.0 | 3.0 |
| Loss tangent LTi | 0.03 | 0.03 | 0.03 | 0.03 | 0.03 |
| Complex elastic modulus Ei* [MPa] | 3.0 | 3.0 | 3.0 | 3.0 | 3.0 |
| Loss tangent LTo | 0.06 | 0.06 | 0.06 | 0.06 | 0.06 |
| Complex elastic modulus Eo* [MPa] | 3.0 | 3.0 | 3.0 | 3.0 | 3.0 |
| Rolling resistance | 83 | 83 | 83 | 83 | 83 |
| Damage-to-bead resistance | 134 | 139 | 143 | 146 | 138 |
| External damage resistance | 100 | 100 | 100 | 100 | 100 |
| Crack resistance | 150 | 150 | 150 | 150 | 150 |
| Wear resistance | 140 | 140 | 140 | 140 | 140 |

TABLE 6

Evaluation result

|  | Example 20 | Example 21 | Example 22 | Comparative example 6 |
|---|---|---|---|---|
| Ratio (Hi/Hr) | 1.0 | 1.0 | 1.0 | 1.0 |
| Ratio (Ho/Hr) | 2.0 | 2.0 | 2.0 | 2.0 |
| Ratio (Hp/Hr) | 3.0 | 3.0 | 3.0 | 3.0 |
| Difference (Hp − Hf) [mm] | 10.0 | 10.0 | 10.0 | 10.0 |
| Thickness Ti [mm] | 3.0 | 3.0 | 3.0 | 3.0 |
| Loss tangent LTi | 0.01 | 0.02 | 0.05 | 0.07 |
| Complex elastic modulus Ei* [MPa] | 3.0 | 3.0 | 3.0 | 3.0 |
| Loss tangent LTo | 0.06 | 0.06 | 0.06 | 0.06 |
| Complex elastic modulus Eo* [MPa] | 3.0 | 3.0 | 3.0 | 3.0 |
| Rolling resistance | 78 | 80 | 90 | 105 |
| Damage-to-bead resistance | 138 | 145 | 140 | 125 |
| External damage resistance | 100 | 100 | 100 | 100 |
| Crack resistance | 150 | 150 | 150 | 150 |
| Wear resistance | 140 | 140 | 140 | 140 |

As indicated in Tables 1 to 6, in the tires of the present invention, rolling resistance is reduced while durability is advantageously maintained. The evaluation result clearly indicates that the present invention is superior.

The tire according to the present invention can be mounted to various vehicles.

The foregoing description is in all aspects illustrative, and various modifications can be devised without departing from the essential features of the invention.

What is claimed is:
1. A pneumatic tire comprising:
   a tread having an outer surface which forms a tread surface;

a pair of sidewalls that extend inward from ends, respectively, of the tread in a radial direction;
a pair of chafers disposed inward of the sidewalls, respectively, in the radial direction;
a pair of beads disposed inward of the chafers, respectively, in an axial direction; and
a carcass extended on and between one of the beads and the other of the beads along inner sides of the tread and the sidewalls, wherein
each bead includes a core, an apex that extends outward from the core in the radial direction, and a packing rubber that extends outward from the apex in the radial direction,
the sidewalls each include an outer layer, and an inner layer disposed inward of the outer layer in the axial direction so that the outer layer forms a part of an outer surface of the tire and the inner layer contacts with the axially inner side surface of the outer layer,
the position of an outermost end of each inner layer is outward of the position of an outermost end of the respective packing rubber in the radial direction,
a loss tangent LTi of the inner layer is less than a loss tangent LTo of the outer layer,
a complex elastic modulus Ei* of the inner layer is less than a complex elastic modulus Ec* of the chafers,
the carcass includes a carcass ply,
the carcass ply is turned up around the bead cores from an inner side toward an outer side in the axial direction, and, by the carcass ply being turned up, the carcass ply has a main portion and turned-up portions,
in a state where the tire is mounted on a normal rim, Hr represents a height, in the radial direction, from a bead base line BBL to an outermost end of the rim, Hi represents a height, in the radial direction, from the bead base line BBL to an innermost end of the inner layer, a ratio (Hi/Hr) of the height Hi to the height Hr is greater than or equal to 0.0 and not greater than 3.0, and
Po represents an innermost end, in the radial direction, of an interface between the outer layer and a respective one of the chafers, a position of the innermost end Po is equal to a position of the outermost end of the rim or is outward of the position of the outermost end of the rim in the radial direction, and the position of the innermost end Po is equal to a position of an outermost end of a respective one of the turned-up portions or is inward of the position of the outermost end of the turned-up portion in the radial direction.

2. The pneumatic tire according to claim 1, wherein the ratio (Hi/Hr) of the height Hi to the height Hr is not greater than 1.5.

3. The pneumatic tire according to claim 1, wherein Lp represents an imaginary line that extends in the axial direction from the outermost end, in the radial direction, of the turned-up portion, and a thickness Ti, of the inner layer, measured along the imaginary line Lp is greater than or equal to 2 mm and not greater than 5 mm.

4. The pneumatic tire according to claim 1, further comprising reinforcing fillers which are turned up around the bead cores on an outer side of the carcass ply, wherein
the reinforcing fillers each include: a first end disposed inward of a respective one of the beads in the axial direction, and a second end disposed outward of the bead in the axial direction,
Hf represents a height, in the radial direction, from the bead base line BBL to the second end, and a difference (Hp-Hf) between: a height Hp from the bead base line BBL to the outermost end, in the radial direction, of the turned-up portion; and the height Hf, is greater than or equal to 6 mm and not greater than 14 mm.

5. The pneumatic tire according to claim 1, wherein a ratio (Hp/Hr) of a height Hp from the bead base line BBL to the outermost end, in the radial direction, of the turned-up portion relative to the height Hr, is greater than or equal to 2 and not greater than 4.

6. The pneumatic tire according to claim 1, wherein the loss tangent LTi of the inner layer is higher than or equal to 0.02 and not higher than 0.05.

7. The pneumatic tire according to claim 1, wherein the complex elastic modulus Ei* of the inner layer is higher than or equal to 2 MPa and not higher than 5 MPa.

8. A pneumatic tire according to claim 1, wherein a thickness Te of each inner layer, which is measured along the imaginary line Le that extends in the axial direction from the outer side end of the respective packing rubber, is greater than or equal to 2.0 mm and not greater than 6.0 mm.

* * * * *